United States Patent
Schultz (10) Patent No.: US 7,593,210 B2
(45) Date of Patent: Sep. 22, 2009

(54) PERMANENT MAGNET BULK DEGAUSSER

(75) Inventor: Robert A. Schultz, Lincoln, NE (US)

(73) Assignee: Data Security, Inc., Lincoln, NE (US)

( * ) Notice: Subject to any disclaimer, the term of this patent is extended or adjusted under 35 U.S.C. 154(b) by 0 days.

(21) Appl. No.: 12/024,820

(22) Filed: Feb. 1, 2008

(65) Prior Publication Data

US 2008/0180203 A1 Jul. 31, 2008

Related U.S. Application Data

(63) Continuation of application No. 10/897,882, filed on Jul. 23, 2004, now abandoned.

(51) Int. Cl.
*H01F 13/00* (2006.01)
*H01H 47/00* (2006.01)

(52) U.S. Cl. ................. 361/149; 361/143; 361/147; 361/150

(58) Field of Classification Search ............. 361/149, 361/150, 143, 147
See application file for complete search history.

(56) References Cited

U.S. PATENT DOCUMENTS

| | | |
|---|---|---|
| 2,481,392 A | 9/1949 | Camras |
| 2,766,328 A | 10/1956 | Handschin et al. |
| 2,962,560 A | 11/1960 | Folse |
| 3,023,280 A | 2/1962 | Tronslin et al. |
| 3,078,396 A | 2/1963 | Englested |
| 3,143,689 A | 8/1964 | Hall |
| 3,329,872 A | 7/1967 | Amos |
| 3,588,623 A | 6/1971 | Camras |
| 3,711,750 A | 1/1973 | Huffman et al. |
| 3,872,347 A | 3/1975 | Matsushima et al. |
| 3,879,663 A | 4/1975 | Stark, Jr. |
| 3,879,754 A | 4/1975 | Ballinger |
| 3,895,270 A | 7/1975 | Maddox |
| 3,938,011 A | 2/1976 | Littwin |
| 4,136,373 A | 1/1979 | Amos |
| 4,146,956 A | 4/1979 | Fujiwara |

(Continued)

FOREIGN PATENT DOCUMENTS

GB 1347531 2/1974

(Continued)

OTHER PUBLICATIONS

Elleaume, P. et al., "Design Considerations for a 1 Angstrom SASE Undulator"; 45 pgs.

(Continued)

*Primary Examiner*—Fritz M. Fleming
*Assistant Examiner*—Lucy Thomas
(74) *Attorney, Agent, or Firm*—Fitch, Even, Tabin & Flannery (57) ABSTRACT

One or more pairs of magnet assemblages (14 and 16) are provided with magnetized segments (21-30) arranged in a Halbach-like array. The magnet assemblages (14 and 16) define a gap (18) through which magnetic data storage media (12) pass in a direction (20) across the segments (21-30). The magnetized sides (36) of the magnet assemblages (14 and 16) face each other thereby creating strong magnetic fields which degauss the magnetic data storage media (12) passing through the gap (18).

27 Claims, 9 Drawing Sheets

U.S. PATENT DOCUMENTS

| | | | |
|---|---|---|---|
| 4,157,581 A | 6/1979 | Keiichi et al. |
| 4,180,835 A | 12/1979 | Okumura et al. |
| 4,187,521 A | 2/1980 | Rotter et al. |
| 4,346,426 A | 8/1982 | Baumann et al. |
| 4,378,581 A | 3/1983 | Kuno et al. |
| 4,423,460 A | 12/1983 | Jackson et al. |
| 4,462,055 A | 7/1984 | Jackson et al. |
| 4,462,059 A | 7/1984 | Yamagami et al. |
| 4,467,389 A | 8/1984 | Knipp |
| 4,471,403 A | 9/1984 | Dress, Jr. et al. |
| 4,551,782 A | 11/1985 | Seely et al. |
| 4,617,603 A | 10/1986 | Johnson et al. |
| 4,639,821 A | 1/1987 | Littwin et al. |
| 4,730,230 A | 3/1988 | Helfrick |
| 4,751,608 A | 6/1988 | Schultz |
| 4,829,397 A | 5/1989 | Vernikov et al. |
| 4,847,727 A | 7/1989 | Spaman |
| 4,862,128 A | 8/1989 | Leupold |
| 4,897,759 A | 1/1990 | Becker |
| 5,132,860 A | 7/1992 | Von Stein |
| 5,198,959 A | 3/1993 | Scholtysik et al. |
| 5,204,801 A | 4/1993 | Becker et al. |
| 5,270,899 A | 12/1993 | Saito |
| 5,416,664 A | 5/1995 | Becker et al. |
| 5,420,742 A | 5/1995 | Ketcham et al. |
| 5,466,574 A | 11/1995 | Liberti et al. |
| 5,666,413 A | 9/1997 | Kempf |
| 5,721,665 A | 2/1998 | Schultz |
| 5,723,917 A | 3/1998 | Chitayat |
| 5,787,619 A | 8/1998 | Urushibata |
| 5,886,609 A | 3/1999 | Stelter |
| 5,969,933 A | 10/1999 | Schultz et al. |
| 6,316,849 B1 | 11/2001 | Konkola et al. |
| 6,570,727 B1 | 5/2003 | Tamura et al. |
| 6,594,099 B2 | 7/2003 | Serizawa |
| 6,664,880 B2 | 12/2003 | Post |
| 6,714,398 B2 | 3/2004 | Schultz |
| 6,731,491 B2 | 5/2004 | Schultz |
| 7,027,249 B2 | 4/2006 | Hasegawa et al. |
| 2002/0021521 A1 | 2/2002 | Kitahori et al. |
| 2003/0021652 A1 | 1/2003 | Uno et al. |
| 2003/0043528 A1 | 3/2003 | Schultz |
| 2003/0227734 A1 | 12/2003 | Schultz |
| 2004/0051989 A1 | 3/2004 | Hasegawa et al. |

FOREIGN PATENT DOCUMENTS

| | | |
|---|---|---|
| JP | 60-129909 | 7/1985 |
| WO | 9610832 A | 4/1996 |

OTHER PUBLICATIONS

Kumada, M. et al., "Issues with Permanent Magnets"; 4 pgs.

Mallinson, J.C., "One-Sided Fluxes—A Magnetic Curiosity?"; IEEE Transactions on Magnetics, vol. MAG-9, No. 4, Dec. 1973; 3 pgs.

Product brochure, "Sanix Bulk Tape Eraser 3300 Series"; 5 pgs.

Product brochure, Data Security, Inc.; "HD-3000" Degausser, May 1997; 2 pgs.

Product brochure, Data Security, Inc.; "Type II-A" Bulk Degausser, May 1997; 2 pgs.

Product brochure, Data Security, Inc.; "Type III" Bulk Degausser, May 1997; 2 pgs.

Product brochure, Data Security, Inc.; "HD-2000" Degausser, May 1997; 2 pgs.

"Operator Manual 5661C Degausser"; Rimage P/N 889057-003, Revision 03, Sep. 21, 1990, Rimage Corporation; 3 pgs.

Reed, J., "Degaussing Electromagnetic Articles by the Phase Control of AC Power"; Western Electric Company, Inc, Technical Digest No. 33, pp. 45-46; Jan. 1974.

European Search Report and Opinion regarding related application EP 05016028.2; Mar. 30, 2007.

PERMANENT MAGNET BULK DEGAUSSER

RELATED APPLICATION

This application is a continuation of prior application Ser. No. 10/897,882, filed Jul. 23, 2004, now abandoned.

FIELD OF THE INVENTION

This invention relates generally to magnetic degaussers and more particularly to permanent magnet magnetic degaussers for erasing magnetic data storage devices.

BACKGROUND

Magnetic degaussing systems of various kinds are known in the art. Typically, magnetic fields of varying strength and direction are applied to the item to be degaussed forcing the magnetization within the object to change thereby destroying any patterns therein. Magnetic degaussing systems have become increasingly important with the increasing use of magnetic data storage. Data stored magnetically can remain on the storage medium for long periods of time after its use. For example, a computer disk's data can be retrieved even after a user has "erased" the data from the disk because the old data will not be changed until new data is written over that segment of the disk. If another person were to obtain the disk, that person may be able to access information from that disk.

In the art of bulk degaussing of magnetic data storage media, electrically powered degaussing systems are commonly used. For example, laminated steel cores of extruded "U" shapes in association with electrical windings are generally recognized as one configuration suitable for erasure of magnetic data storage media. Similarly, "E" shaped cores may be used. Pairs of such cores are often configured opposite each other with like poles facing, although single sided and offset configurations are also known in the art. Although such configurations are suitable for some situations, these systems have the disadvantage of needing a power source to create the fields necessary for magnetic data storage media erasure.

More recently, the discovery and improvement of rare earth permanent magnets have made the generation of magnetic fields of strengths suitable for bulk media erasure using permanent magnets practical. Such permanent magnets can be arranged with steel elements into magnetic circuits that act much like their electric counterparts. The weight requirements of permanent magnet systems are about equal to the electric systems. Further, the zero power input required by permanent magnets offsets higher production costs as compared to electric systems.

Another advantage of permanent magnet systems includes the use of individual elements, which may be off-the-shelf items, rather than trying to fabricate large elements or permanently magnetizing a single large shape. For example, it is known that a total of eight 2-inch by 2-inch by 1-inch neodymium-iron-boron (NeFeB) blocks, magnetized in the 1-inch direction, can be adhered by magnetic attraction onto steel plates as groups of four blocks thereby forming two 2-inch by 8-inch poles, a classic "U" shape magnet of 8-inch depth. Two such "U" shapes can be configured with like poles facing in repulsion across a gap suited to passage of 1-inch thick magnetic media. Such an assemblage can apply a magnetic field with good uniformity and at least 6000 gauss to every point in a common form factor for magnetic data storage media passing through that field. It is understood that at least a second passage of a magnetic storage medium through the field with a different orientation between the storage medium and the magnetic field is necessary to impart the desired change within the storage medium to affect magnetic data storage erasure.

Despite the advantages of these known permanent magnet systems, certain drawbacks exist. For instance, magnetic data storage media are being developed with increasing magnetic coercivities such that much stronger fields must be applied to completely erase the media. As such, the 6000 gauss strength achieved by known permanent magnet bulk degaussing systems is marginal with respect to the emerging media's coercivities.

Attempts to increase the strength of the known permanent magnet bulk degaussing systems by scaling up the systems, however, quickly lead to diminishing returns. Such scaling of prior art includes stacking off-the-shelf elements in their direction of magnetization, placing elements side by side on the steel plates, stacking and placing elements, or substituting larger custom-made elements or magnets for the off-the-shelf elements. It is generally recognized in the art of bulk degaussing that worst case field strength drives performance and that a measure of nonuniformity in field strength can be tolerated. It is also known that attempts to furnish field strengths sufficient for erasure of magnetic storage media with higher coercivities using various prior art facing "U" arrangements would require at least a correspondingly increased amount of NeFeB or other magnetic material plus thick steel components needed to complete the required magnetic circuit. Such a system would result in an unacceptable degree of field strength nonuniformity across the gap. In particular, the diminishing returns from prior art scaling using NeFeB elements arise due to flux leakage from NeFeB elements to each other and into the steel plates where media cannot be placed to affect erasure.

Additionally, any such scaling results in larger volume, increased weight, and greater cost. It is well known that in the assembly of the prior art permanent magnet systems, regions of both magnetic attraction and magnetic repulsion will arise between various elements and members. For example, magnets are attracted to steel plates and to each other when stacked with unlike poles facing. Conversely, placing magnets adjacent to each other with the same magnetic direction causes repulsion, as does placing like poles facing each other across a gap. To counter such forces, framework members must be added. In the prior devices, a thick steel plate serves a dual role as a required component of the magnetic circuit and as one of the framework members, but other members generally must be of nonmagnetic materials to avoid undesirable magnetic circuit paths or unnecessary magnetic field fringing effects. In particular, prior devices require an attraction-countering member between unlike poles, which experiences extreme compressive force, and this member cannot be magnetic steel. These structural requirements only become aggravated with the scaling of the prior permanent magnet devices.

BRIEF DESCRIPTION OF THE DRAWINGS

The above needs are at least partially met through provision of the permanent magnet bulk degausser described in the following detailed description, particularly when studied in conjunction with the drawings, wherein:

FIGS. 5a(1) and 5a(2) are graphs showing the magnetic flux density along the gap between a pair of magnet assemblages in accordance with FIG. 4a;

FIGS. 5b(1) and 5b(2) are graphs showing the magnetic flux density along the gap between a pair of magnet assemblages in accordance with FIG. 4b;

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE PREFERRED EMBODIMENT(S)

Figure 1:
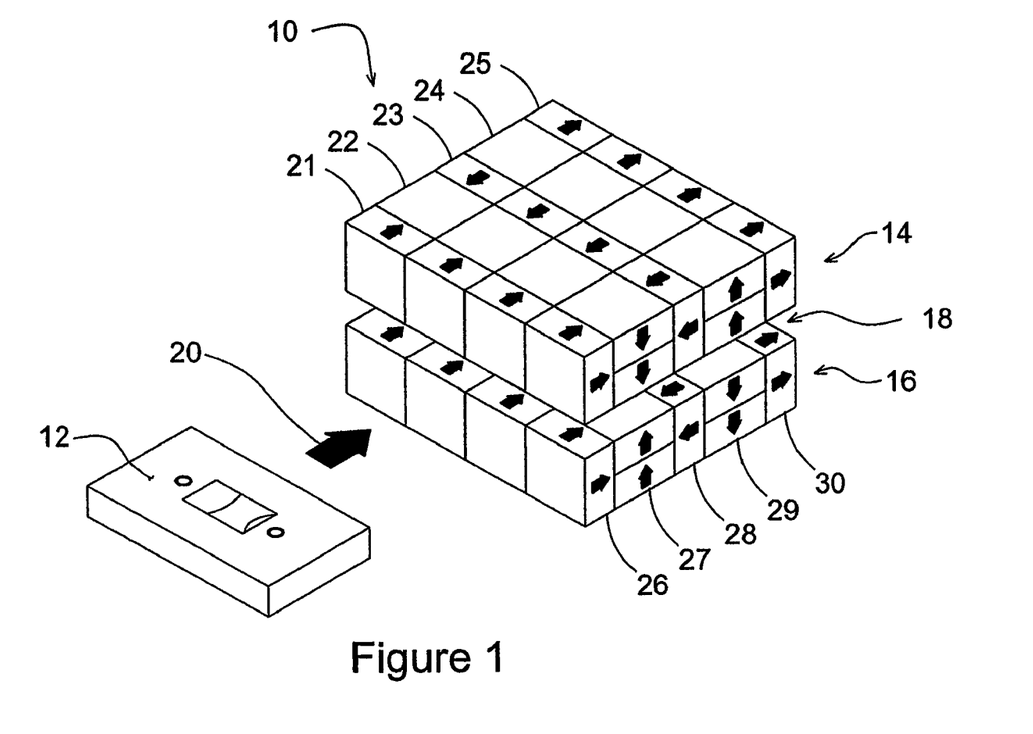
FIG. 1 is a perspective view of a permanent magnet bulk degausser embodying features of the present invention.

With reference to FIG. 1, there is illustrated a permanent magnet bulk degausser 10 for erasing magnetic storage media 12. The apparatus 10 includes a pair of magnet assemblages 14 and 16 arranged so as to define a gap 18 through which magnetic storage media 12 passes in the direction as indicated by arrow 20 across each segment 21-25 and 26-30 of the assemblages 14 and 16. By moving in this direction 20, the magnetic data storage medium 12 passes through the magnetic field created by the magnet assemblages 14 and 16 thereby facilitating erasure of data on the medium 12. One should note that the magnetic data storage medium 12 can be any medium including magnetic tape, computer disks, hard drives, and the like.

The segments 21-25 and 26-30 are aligned adjacently within each magnet assemblage 14 and 16 with the direction of magnetization of each successive segment rotated by approximately 90 degrees relative to the previous segment. More specifically, the direction of magnetization across successive segments rotates in the same direction so that the direction of magnetization repeats within a magnet assemblage only every fifth segment. This magnetization arrangement is commonly known as a Halbach array. In a variation on the traditional Halbach array, segments 22 and 24 of magnet assemblage 14 with directions of magnetization approximately perpendicular to the gap 18 have two rows of permanent magnets, whereas segments 21, 23, and 25 with directions of magnetization approximately parallel to the gap 18 have one row of permanent magnets.

Figure 2:
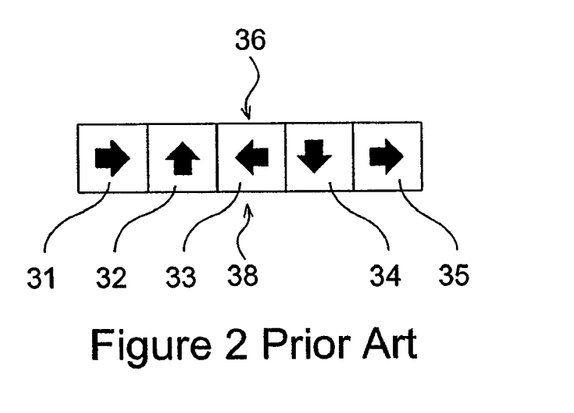
FIG. 2 is a side plan view of a Halbach array of square cross-section permanent magnet elements with directions of magnetizations shown by arrows.

The traditional Halbach array ascribed to Klaus Halbach, as conventionally illustrated in two dimensions in FIG. 2, includes a linear sequence of adjacent squares 31-35 magnetized such that the direction of magnetization in each adjacent square rotates 90 degrees with respect to its neighbor, with the direction of rotation constant from element to element. The arrows designate a direction of magnetization pointing from magnetic South to magnetic North; however, this convention may be reversed without affecting performance as long as the convention is uniformly applied within a given embodiment. The Halbach array arrangement forms a strongly magnetic side 36. Neglecting slight imperfections in dimension, shape, and magnetization, side 38 is largely self-shielding and non-magnetic. Such linear arrays can be illustrated as an unlimited sequence, and the square element construction shown in FIG. 2 typically yields a substantially sinusoidal magnetic field strength along the direction of the array on the magnetic side 36 of the array. As such, the magnet assemblages 14 and 16 of FIG. 1 are arranged with the magnetic side of each assemblage facing the gap 18.

Figure 3:
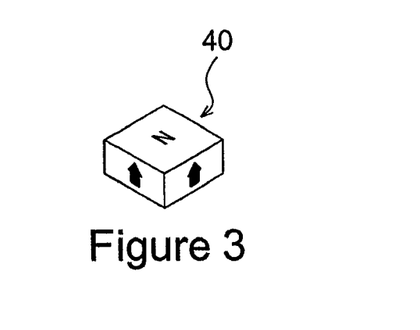
FIG. 3 is a perspective view of a preferred permanent magnet element.

Preferably each segment 21-30 includes a plurality of permanent magnets arranged in at least one row such that each permanent magnet in the segment has a direction of magnetization pointing in the same direction, substantially perpendicular to the length of the row. The preferred permanent magnet element 40 as illustrated in FIG. 3 is a readily available NeFeB block such as a 2-inch square by 1-inch thick block with a direction of magnetization (as indicated in the figures by an arrow) in the direction of the block's thickness. Such a magnetization produces a magnetic North pole on one 2-inch square face of the block and a magnetic South pole on the opposite 2-inch square face. Neglecting fringing effects at the ends, each preferred permanent magnet generates a 2-inch wide field in the magnetized direction. Placing additional preferred permanent magnets in a row will provide 4-inch, 6-inch, and so on wide fields. As is the case with prior devices, one additional adjacent magnet suffices to counter fringing effects.

One should understand that in three dimensions, such elements or segments depicted as having a square cross section may be square plates, cubes, or rods. Similarly, other permanent magnetic materials may be used. For example, SmCo blocks have aspect characteristics similar to NeFeB and can substitute for it. Also, a particular element size is not necessary. For instance, various segments 21-25 or 26-30 within a magnet assemblage 14 or 16 may have varying sizes and/or shapes. Alternatively, each segment can be an integral permanent magnet with a magnetization in a direction substantially perpendicular to the segment's longest dimension. Also, a complex fixture could magnetize a single large block into a one-piece magnet assemblage with several differently magnetized segments of the block.

Additionally, it is understood that assembling the invention from individual blocks can introduce acceptable minor field imperfections due to surface roughness, size and shape tolerance, and the common practice of plating NeFeB material. Similarly, introduction of thin nonmagnetic elements such as shims between permanent magnet elements 40 or segments 21-25 or 26-30 may introduce some acceptable field imperfections. Likewise, relatively thin and magnetically soft ferromagnetic materials introduced as shims between permanent magnet elements 40 or segments 21-25 or 26-30 would hardly disturb the fields.

Figure 4:
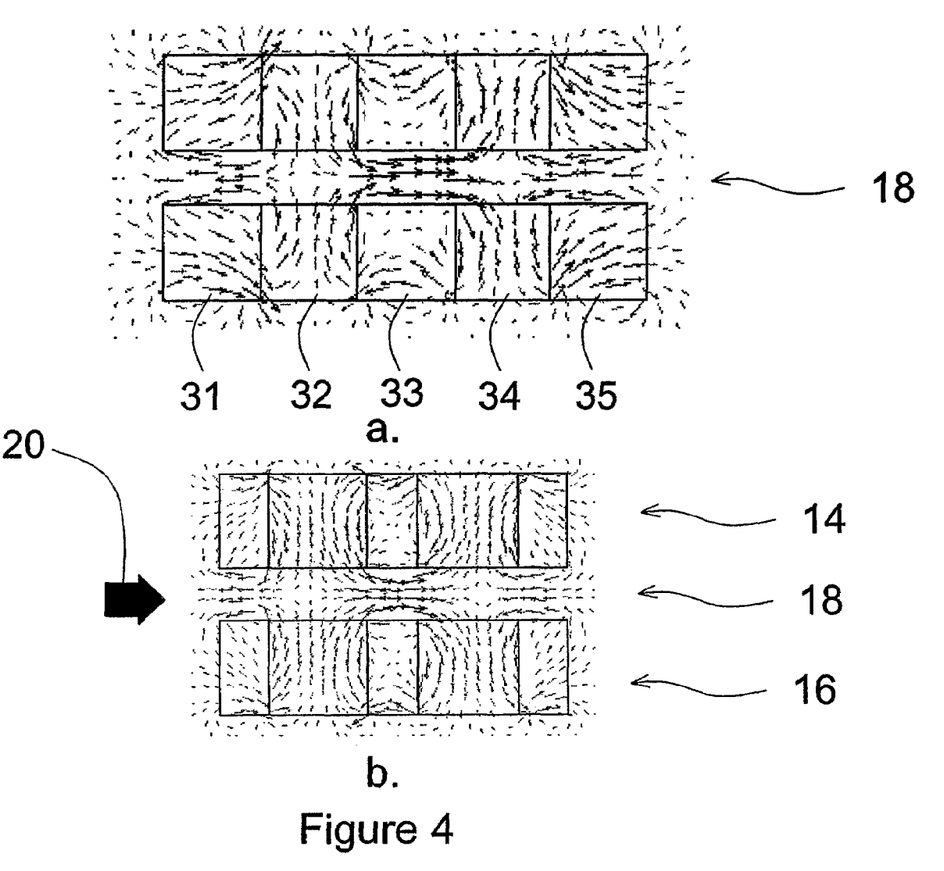
FIG. 4a is a side plan view of a model of the magnetic fields created by a pair of magnet assemblages in accordance with the array of FIG. 2.
FIG. 4b is a side plan view of a model of the magnetic fields created by the pair of magnet assemblages illustrated in FIG. 1.

FIGS. 4a and 4b model the magnetic flux vectors of two embodiments where the magnet assemblages are arranged in repulsion across the gap 18. For objective comparisons, all models disclosed herein use residual flux density ($B_r$) of 10,000 gauss. One skilled in the art will recognize that NeFeB grades are available with $B_r$ exceeding 13,000 gauss. FIG. 4a demonstrates the magnetic flux for an embodiment using a traditional Halbach array as illustrated in FIG. 2 with square segment cross-sections. FIG. 4b models the magnetic flux for the preferred embodiment non-traditional Halbach array as illustrated in FIG. 1. For both embodiments, magnetic flux concentrates within the gap 18, and minimal magnetic flux is present outside the gap 18.

Figure 5A:
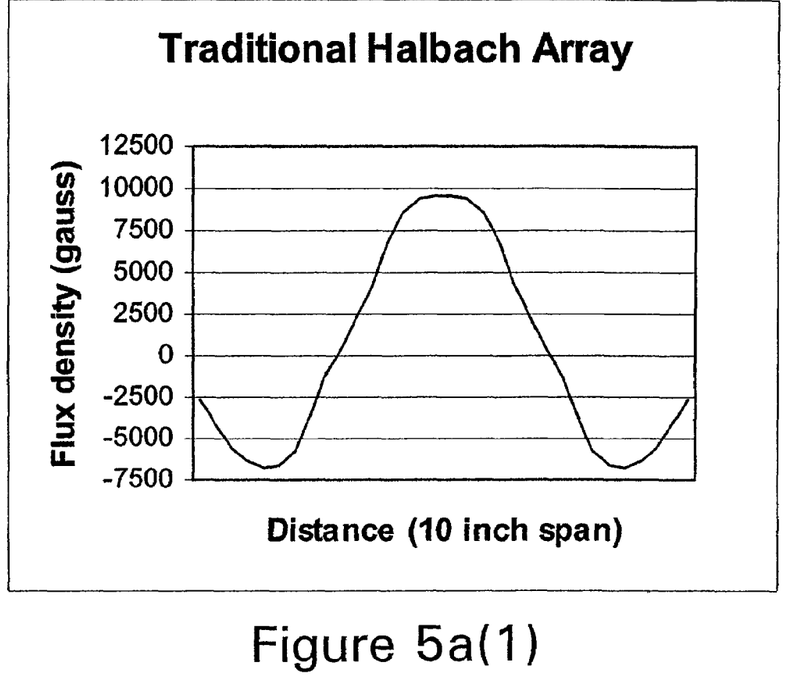
Figure 5B:
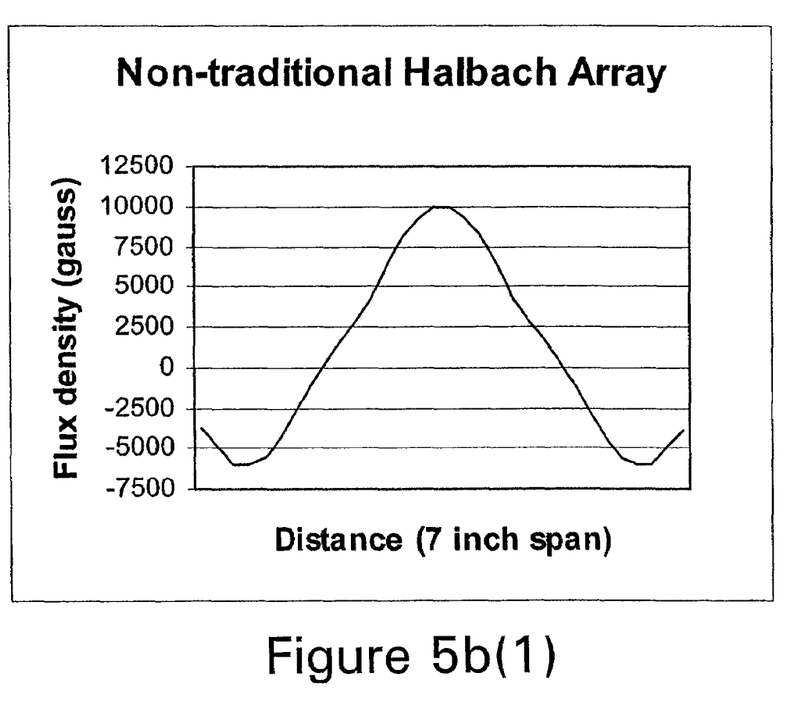

FIGS. 5a(1) and 5a(2) illustrate a spatial waveform derived from the internal field of the magnet assemblage pair of FIG. 4a. It can be seen that the waveforms of FIGS. 5 a(1) and 5a(2) approximate a "windowed" sinusoid. FIGS. 5b(1) and 5b(2) illustrate a spatial waveform derived from the internal field of the preferred embodiment model of FIG. 4b. It can be seen that the waveforms of FIGS. 5b(1) and 5b(2) have a distinctively triangular characteristic when compared to the waveforms of FIGS. 5a(1) and 5a(2).

Figure 7:
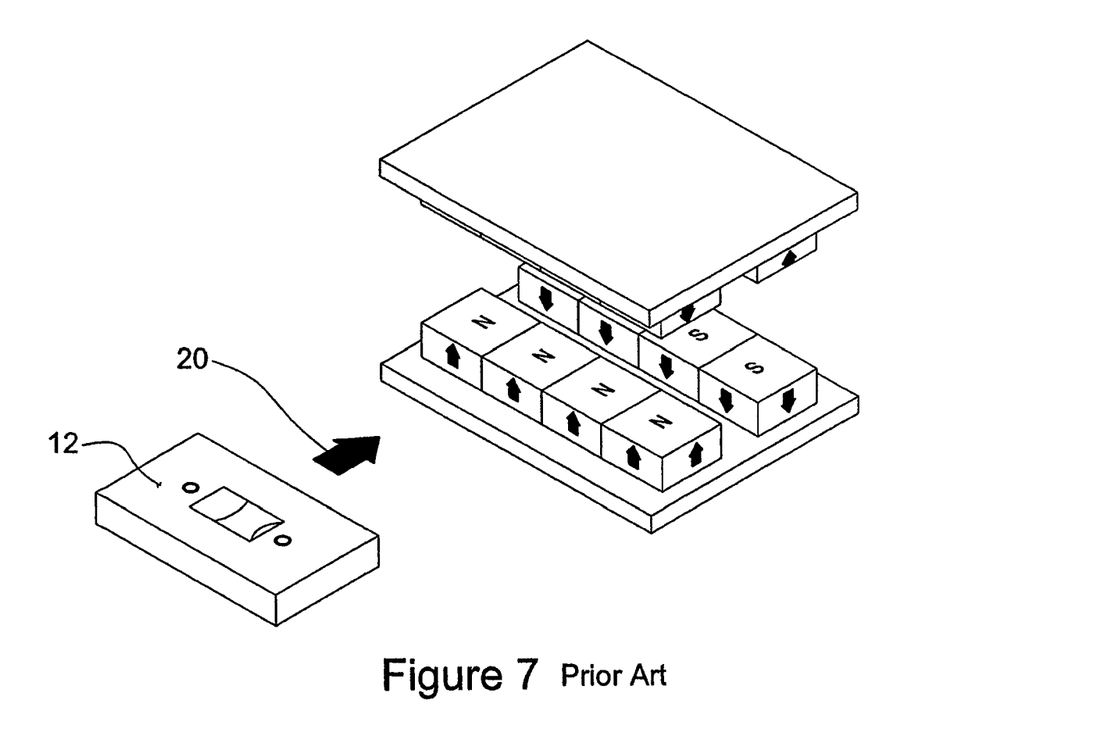
FIG. 7 is a perspective view of a prior art permanent magnet bulk degausser.

The harmonic content above the fundamental as seen in FIGS. 5b(1) and 5b(2) may be detrimental to some Halbach applications, such as for particle beam accelerator components. Peak strength, however, is paramount in the art of erasing magnetic media, and the harmonic content of the numeric analysis given in FIGS. 5b(1) and 5b(2) indicates a 4% stronger field, nearly a 10,000 gauss peak magnetic field, for the preferred embodiment non-traditional Halbach array when compared to the traditional Halbach array embodiment. By contrast, prior art magnetic circuits, such as illustrated in FIG. 7, generate only about half this strength, and scaling of the prior art magnetic circuit shown in FIG. 7 by adding additional permanent magnets fails to achieve the field strengths of the embodiments of the invention while using a comparable amount of NeFeB. For example, doubling the NeFeB material in either of two dimensions of the prior permanent magnet degausser of FIG. 7 increases the magnetic strength from about half that of the embodiments of FIGS. 4a and 4b to about 70% of that strength. Doubling NeFeB in both dimensions of the prior art degausser uses more material than a non-traditional Halbach embodiment but has several percent less field strength.

Figure 6:
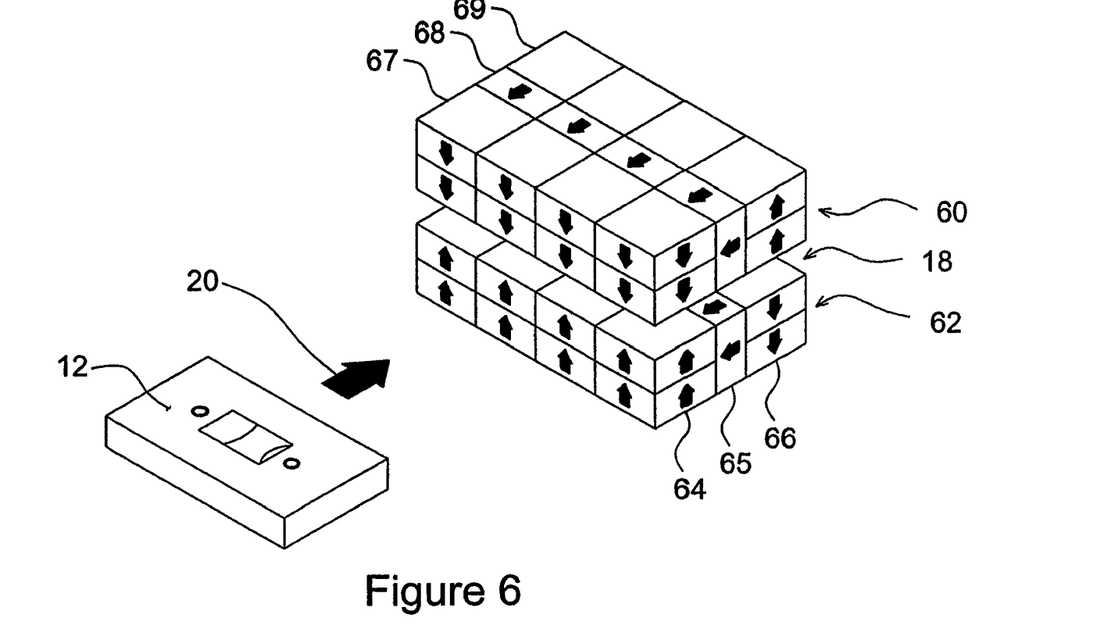
FIG. 6 is a perspective view of an alternate permanent magnet bulk degausser embodying features of the present invention.

Alternatively, Halbach-like arrays of more or less than five segments can be utilized. For example, a mirror-imaged pair of three-segment (as illustrated in FIG. 6) or five-segment (as illustrated in FIG. 1) assemblages with magnetic sides facing in repulsion creates fields much like the prior art permanent magnet facing "U" arrangements (as illustrated in FIG. 7), but each embodiment offers respectively improving degrees of uniformity of field. Simulations indicate that the three-segment arrangement of FIG. 6 nearly doubles the field strength of the prior permanent magnet arrangement of FIG. 7. A seven-segment arrangement not only doubles the prior arrangement's strength, but also produces two magnetic fields of equal strength and opposite direction along a media path 20.

In one such alternative embodiment illustrated at FIG. 6, as few as three segments 64, 65, and 66 can be arranged within a magnet assemblage 62 in a configuration not generally recognized as a complete Halbach array, but still effective for erasing magnet data storage media. The magnet assemblages 60 and 62 of FIG. 6 each have magnetic sides facing toward the gap 18 through which magnetic data storage medium 12 passes. The segments 64-66 of magnet assemblage 62 line up across the gap 18 from the segments 67-69 of magnet assemblage 60 such that the directions of magnetization of segments 64-66 mirror the directions of magnetization of segments 67-69 in what is known as an arrangement in repulsion.

The alternative embodiment of FIG. 6, if built using the preferred permanent magnet, saves 28% on material cost and weight as compared to the embodiment of FIG. 1. Although the alternative embodiment of FIG. 6 also includes less field strength per unit gap width and slightly less uniformity across the gap, such an embodiment could be applied, for example, with a narrower gap 18 to achieve higher strength for future and continually smaller varieties of magnetic storage media.

In addition to the field strength and uniformity advantages of the various embodiments, there is much less need for steel elements and framing materials when compared to prior permanent magnet devices. Contrary to the prior permanent magnet devices, steel is not required for any supporting members or magnetic circuit elements. Also, any such shielding of the small magnetic flux leakage of the various embodiments would only be needed for certain applications such as against compass interference in airborne or other mobile applications. Typically, thin steel also suffices to shield against the slight magnetic flux leakages arising from imperfections in magnet element dimensions and magnetization. In applications where shielding is not a factor, nonmagnetic materials having better strength to weight characteristics can alternatively be used for framing. Additionally, the repulsive or attractive forces between the magnet assemblages of the various embodiments are generally reduced in comparison to prior conventional degaussers. Thus, less extensive framing support is needed.

In alternative embodiments, the overall size of the degausser 10 can be manipulated. For instance, a data processing operation that depends on erasing a large quantity of microminiaturized hard disk drives could benefit from a drastically scaled down version of the invention. In one example, it is now feasible to issue a personal digital assistant (PDA) for each patient entering a hospital. Also, each PDA may include an apparatus for removeably connecting an inexpensive 5 mm thick 4 G Byte disk drive. The PDA could conveniently accompany a patient anywhere in the hospital (except places like MRI imagers) to capture all diagnostic and treatment information on the one drive. Medical records by law, however, must be protected. Thus, by using a physically smaller embodiment of the invention, such small drives can be erased after their use by being passed through the degausser 10. The large variety of NeFeB blocks available off the shelf other than the preferred permanent magnets raises many possibilities for configurations of the invention.

Also, Halbach arrays are known with magnetization angles of less than 90 degrees between segments. Use of multiple thin plate magnet segments with such reduced angular magnetization yield some further optimization for certain applications. Such approaches trade off some loss at additional contact surfaces between segments for improved harmonic content of the magnetic field profile.

Figure 8:
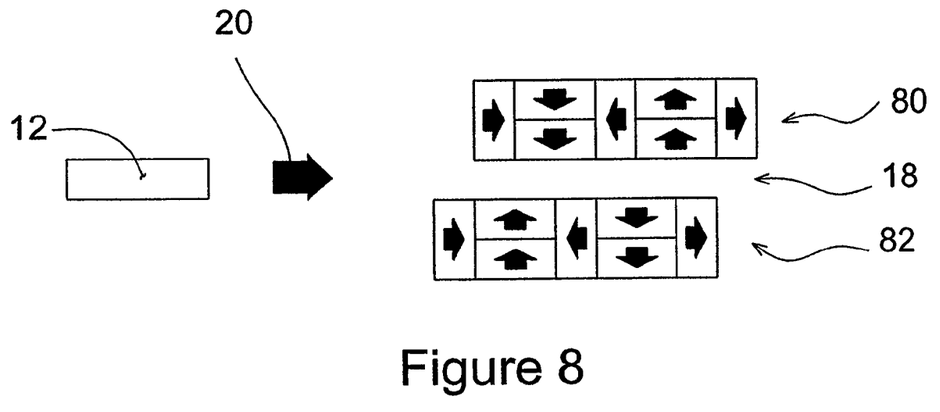
FIG. 8 is a side plan view of an alternate permanent magnet bulk degausser embodying features of the present invention.

In yet another embodiment, a pair of mirror-imaged permanent magnet assemblages 80 and 82 as illustrated in FIG. 8 can be offset from each other by various degrees, generating a magnetic field component in the direction across the gap 18. By varying the offset, a variety of magnetic field directions are produced within the gap 18. Offset embodiments of the invention can address various directional erasure characteristics such as perpendicular recording on hard disk drives.

Figure 9:
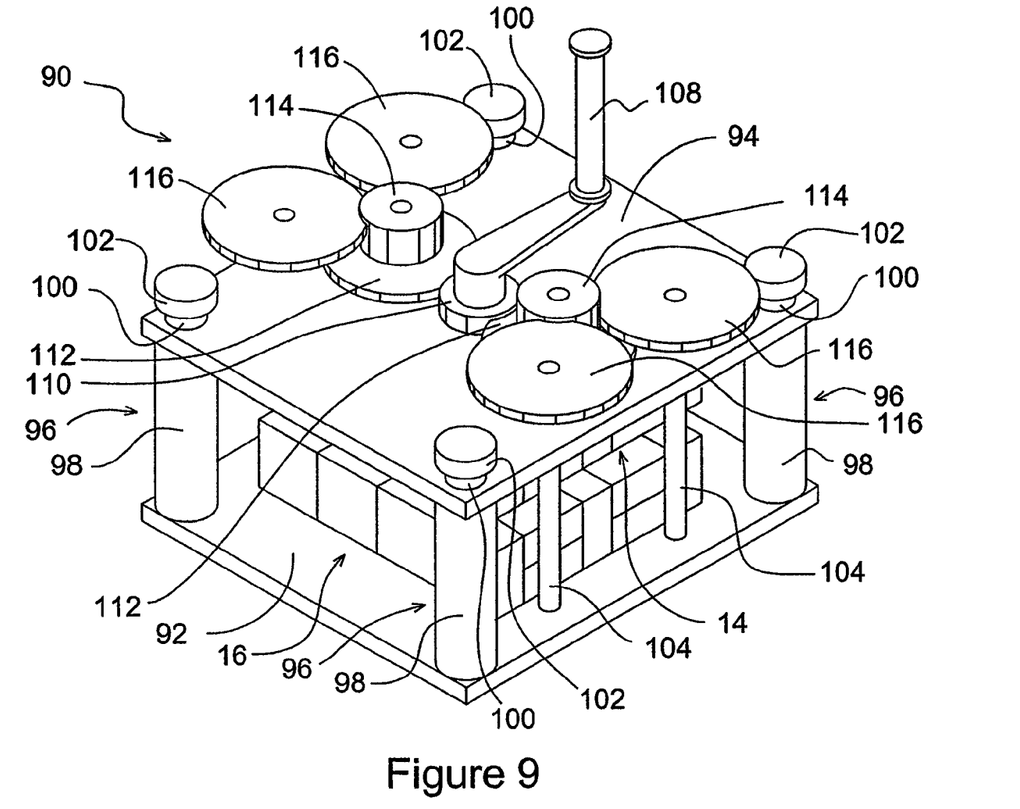
FIG. 9 is a perspective view of a frame structure for use with various embodiments of the permanent magnet bulk degausser.
Figure 10:
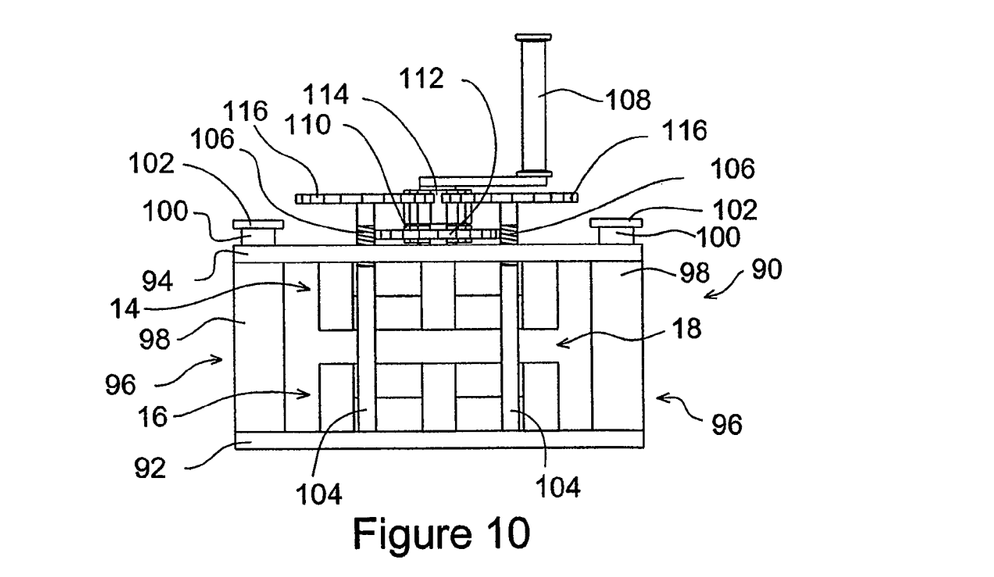
FIG. 10 is a side plan view of the frame structure of FIG. 9.

In still another embodiment, gap adjustability can be introduced to trade off field strength against media thickness capacity. Frame structures for manipulating the magnet assemblages to adjust the gap width and to offset the assemblages are known, and an example of such a frame structure 90 is illustrated in FIGS. 9 and 10. Lower plate 92 supports lower magnet assemblage 16. Upper plate 94 supports upper magnet assemblage 14. Pillars 96 are rigidly affixed to lower plate 92 by any conventional method. The pillars 96 include a thick diameter mid-section 98 between upper magnet assemblage 14 and lower magnet assemblage 16, a smaller diameter upper portion 100 that slip fits through apertures defined (not shown) by upper plate 94, and a thick diameter top portion 102 fixedly attached to smaller diameter upper portion 100. The thick diameter mid-section 98 and top portion 102 of the pillars 96 define the limits of the adjustability of the gap 18. Rods 104 attach to lower plate 92 in a known manner allowing the rods 104 to rotate within and pull on lower plate 92. At least upper portions 106 of rods 104 have screw threads over the range of adjustability that mate with threaded holes (not shown) defined by upper plate 94.

Crank 108 and lower pinion gear 110 rigidly attach to each other and rotatably attach to upper plate 94. Lower spur gears 112 and tall upper pinion gears 114 also rigidly attach to each other and rotatably attach to upper plate 94. Upper spur gears 116 attach rigidly to the partially threaded rods 104. Turning crank 108 causes lower pinion gear 110 to turn lower spur gears 112 that turn tall upper pinion gears 114, thereby causing upper spur gears 116 and rods 104 to turn. Threaded portions 106 of rods 104 act on upper plate 94 to selectively raise or lower it, thus affecting the gap 18 between magnet assemblages 14 and 16 for the passage of various magnetic storage media with different thicknesses.

The form of gap adjustment shown in FIGS. 9 and 10 is illustrative and not limiting. Similar adjustment apparatuses can be provided for other embodiments of the invention, such as offset forms, attractive forms, and multiple assemblage pairs set at angles to a media path. The various forms of the invention can be combined with each other and with prior art along a media path, with or without a gap adjustment apparatus.

Similarly, many prior art applications may be used with the various embodiments to impart the sufficient exposure of the magnetic storage media to varying fields necessary to accomplish complete erasure. As noted above, when trying to erase magnetic storage media, simply providing a simple linear media path through a single magnetic field direction is generally recognized as requiring further media-field variation, such as two passes through the magnetic field combined with a rotation of the media or field. Such actions can be performed by a human operator, or by the use of mechanisms known in the art. Also, various mechanisms can impart a raster-scan-like motion to the magnetic media path to accomplish full magnetic exposure of media volume to a smaller magnetic field volume.

Figure 11:
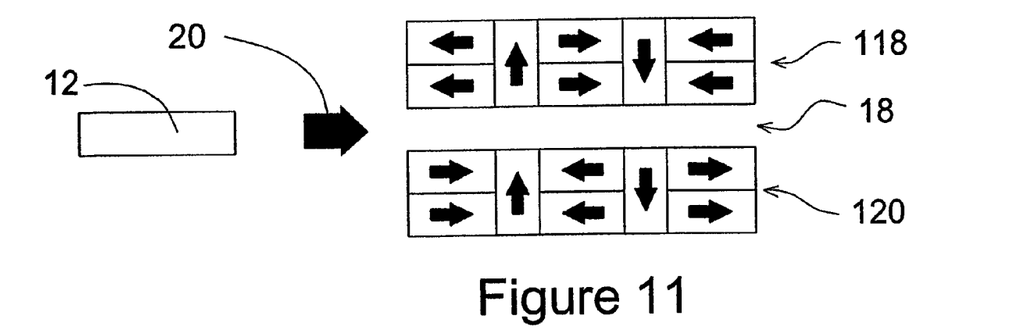
FIG. 11 is a side plan view of an alternate permanent magnet bulk degausser embodying features of the present invention.

Alternatively, two or more pairs of permanent magnet assemblages can provide fields of varying direction along a media path 20. In one embodiment, one pair of magnet assemblages is mirror-imaged across the gap with magnetic sides in repulsion such as the degausser in FIG. 1 forming fields generally in the direction parallel to the gap 18, and another pair has elements arranged so the magnetic sides are in attraction such as the degausser in FIG. 11 forming two fields generally in opposite directions across the gap 18. FIG. 11 illustrates a pair of magnet assemblages 118 and 120 arranged in attraction using a basic permanent magnet element with a direction of magnetization different from that of the preferred magnet element. Like the embodiments of FIG. 1 and FIG. 6, the arrangement illustrated in FIG. 11 can be modified in a number ways including adding or removing segments or by building the pair of assemblages with alternative permanent magnet elements.

Figure 12:
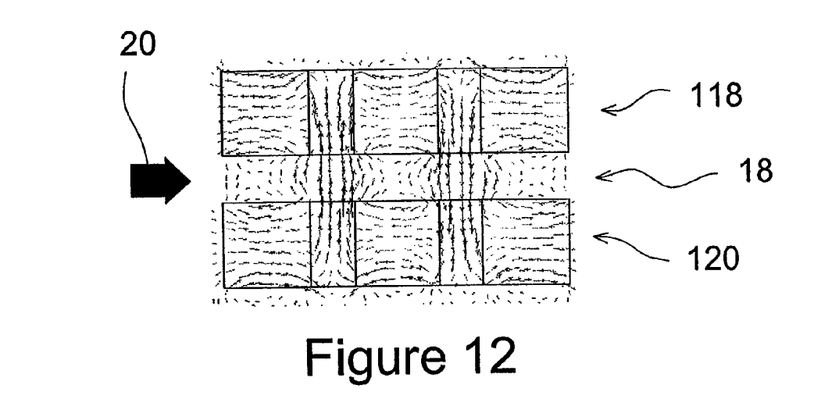
FIG. 12 is a side plan view of a model of the magnetic fields created by the pair of magnet assemblages illustrated in FIG. 11.

FIG. 12 models magnetic flux vectors for the pair of assemblages 118 and 120 in attraction illustrated in FIG. 11 showing strong flux projecting across the gap 18. The assemblages 118 and 120 are also largely non-magnetic and self-shielding outside the gap 18. It can be seen that the pair of five segment assemblages 118 and 120 produces two fields of opposite direction within gap 18. The strength of each field peaks near 10,000 gauss, which, like the assemblage pairs arranged in repulsion, constitutes a significant advance beyond the results achievable with prior magnetic circuits. Passage of magnetic storage media 12 through a magnet assemblage pair arranged in attraction before or after passage through a magnet assemblage pair arranged in repulsion provides the exposure to varying fields necessary for erasure of certain varieties of magnetic storage media.

Figure 13:
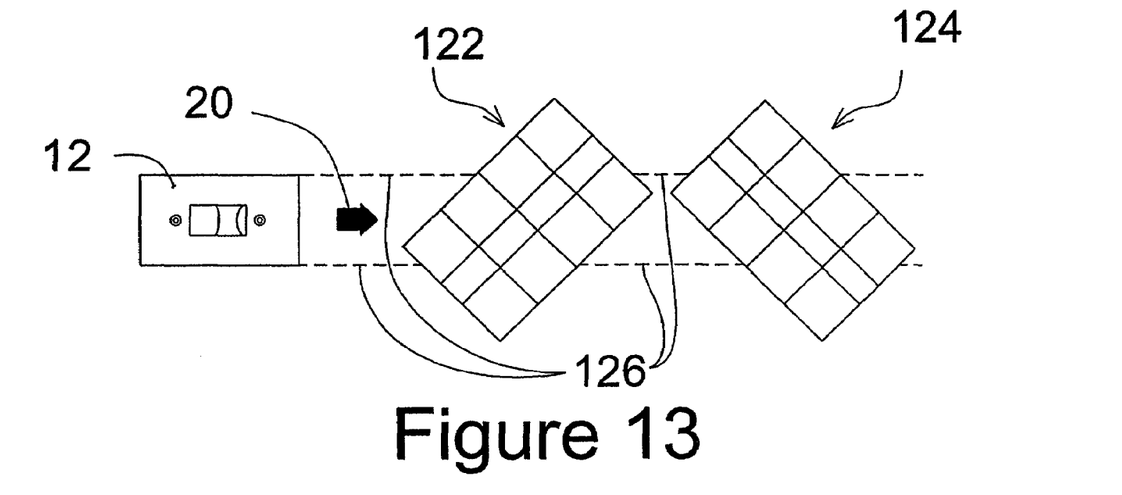
FIG. 13 is a top plan view of an alternate permanent magnet bulk degausser embodying features of the present invention.

In yet another embodiment illustrated in FIG. 13, two pairs of magnet assemblages 122 and 124 with magnetic sides in repulsion, each of depth approximately 1.4 times an intermediate dimension of the magnetic storage media 12 size, are provided along a media path 20 and oriented with field directions at 45 degree angles to that path and at 90 degrees to each other forming a "one pass" configuration sufficient to erase the magnetic storage media with one pass through the magnet assemblages. Such placement reduces the effective width of the field across the path to approximately 70% of the width achieved in embodiments like FIG. 1 or FIG. 6. Unlike those embodiments, the embodiment of FIG. 13 need only treat media 12 with a single pass in the orientation shown with longest dimension aligned in direction of motion 20. The magnetic field direction varies by 90 degrees with along the path 20 through the two pairs of assemblages 122 and 124. Embodiments with a single pair of assemblages generally require two passes, including one pass with the orientation indicated in FIG. 1 and FIG. 6 with longest dimension of media 12 perpendicular to direction 20 to media motion. It can be appreciated that media placement limits 126 reside well clear of the ends of pairs of assemblages 122 and 124 where fringing effects weaken the field strength.

This embodiment can be further modified to add cross-gap magnetic fields, forming a "universal" configuration that erases horizontal and perpendicular hard disk drive media in one pass and no media rotation. For example, to the configuration of FIG. 13 can be added the cross-gap field direction of an array pair with magnetic faces in attraction like that of FIG. 11, forming a "universal" configuration that erases horizontal and perpendicular hard disk drive media in one pass and no media rotation. One should note that not all elements of such multi-gapped embodiments need be Halbach-like arrays.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

I claim:

1. An apparatus for erasing magnetic storage media comprising:
   at least one pair of magnet assemblages;
   each magnet assemblage comprising at least three segments;
   each segment having a direction of magnetization approximately perpendicular to the longest dimension of the segment;
   at least one magnet assemblage arranged such that the segments are aligned adjacently with the direction of magnetization of each successive segment rotated by approximately 90 degrees relative to the previous segment; and
   a gap defined by each pair of magnet assemblages such that a magnetic field created by each assemblage exists at least partially in the gap wherein the gap is sized such that a magnetic storage medium passing through the gap is at least partially erased,
      wherein each successive segment alternates between a first width in a direction alone a path traveled by the magnetic storage medium and a second width in the direction alone the oath traveled by the magnetic storage medium.

2. The apparatus of claim 1 wherein at least one segment is an integral piece.

3. The apparatus of claim 1 wherein at least one segment comprises a plurality of permanent magnets arranged in at least one row such that each permanent magnet in the segment has a direction of magnetization pointing in the same direction.

4. The apparatus of claim 3 wherein at least one permanent magnet includes a cross section in the shape of a square and a height that is one half of a length of a side of the square with the direction of magnetization in the direction of the height of the permanent magnet.

5. The apparatus of claim 3 wherein at least one permanent magnet is a neodymium-iron-boron block.

6. The apparatus of claim 1 wherein the direction of magnetization for each segment is oblique relative to the gap.

7. The apparatus of claim 6 wherein at least one pair of magnet assemblages is aligned such that segments from each magnet assemblage line up across the gap and that each segment mirrors the direction of magnetization of the segment directly across the gap.

8. The apparatus of claim 1 wherein the direction of magnetization for at least one segment is either approximately perpendicular to or approximately parallel to the gap.

9. The apparatus of claim 8 wherein each pair of magnet assemblages includes the same number of segments.

10. The apparatus of claim 9 wherein each pair of magnet assemblages is aligned such that segments from each magnet assemblage line up across the gap and that each segment mirrors the direction of magnetization of the segment directly across the gap.

11. The apparatus of claim 9 wherein each pair of magnet assemblages is aligned such that segments from each magnet assemblage line up across the gap and that each segment with a direction of magnetization approximately perpendicular to the gap points in approximately the same direction as the segment across the gap.

12. The apparatus of claim 9 wherein
   at least one pair of magnet assemblages is aligned such that segments from each magnet assemblage line up across the gap and that each segment mirrors the direction of magnetization of the segment directly across the gap;
   at least one second pair of magnet assemblages is aligned such that segments from each magnet assemblage of the second pair of magnet assemblages line up across the gap and that each segment with a direction of magnetization approximately perpendicular to the gap points in approximately the same direction as the segment across the gap; and
   the gaps for each pair of magnet assemblages line up such that magnetic media storage may pass directly from one gap to the other.

13. The apparatus of claim 1 wherein at least one pair of magnet assemblages is aligned such that segments from at least one magnet assemblage are offset relative to the segments across the gap.

14. The apparatus of claim 1 wherein at least one magnet assemblage comprises a Halbach array across the segments.

15. The apparatus of claim 1 further comprising an adjustable frame structure securing the magnet assemblages such that the width of the gap between the magnet assemblages can be adjusted.

16. The apparatus of claim 1 further comprising a lateral adjustable frame structure securing the magnet assemblages such that the lateral position of the magnet assemblages can be adjusted.

17. An apparatus for erasing magnetic storage media comprising:
   at least two pairs of magnet assemblages;
   each magnet assemblage comprising at least three segments;
   each segment having a direction of magnetization approximately perpendicular to the longest dimension of the segment;
   each magnet assemblage arranged such that the segments are aligned adjacently with the direction of magnetization of each successive segment rotated by approximately 90 degrees relative to the previous segment;
   a gap defined by each pair of magnet assemblages such that a magnetic field created by each assemblage exists at least partially in the gap wherein the gap is sized such that a magnetic storage medium passing through the gap is at least partially erased; and
   at least one of the at least two pairs of magnet assemblages arranged with the segments of the first magnet assemblage aligned at about 90 degrees relative to the segments of the second magnet assemblage and with the segments of both magnet assemblages at about a 45 degree angle relative to a magnetic storage media path through each gap defined by each pair of magnet assemblages,
      wherein each successive segment alternates between a first width and a second width.

18. The apparatus of claim 17 wherein the at least one of the at least two pairs of magnet assemblages are further arranged such that each of the magnet assemblages are arranged in repulsion.

19. The apparatus of claim 17 further comprising:
   at least one additional pair of magnet assemblages disposed on the magnetic storage media path;
   each magnet assemblage of the at least one additional pair comprising at least three segments;
   each segment of the magnet assemblages of the at least one additional pair having a direction of magnetization approximately perpendicular to the longest dimension of the segment;
   each magnet assemblage of the at least one additional pair arranged such that the segments are aligned adjacently with the direction of magnetization of each successive segment rotated by approximately 90 degrees relative to the previous segment; and the at least one additional pair of magnet assemblages arranged in attraction.

20. The apparatus of claim 17 further comprising a frame structure securing the magnet assemblages in a configuration wherein a magnetic storage medium may pass through the frame structure and the gap such that the magnetic storage medium is at least partially erased.

21. The apparatus of claim 20 wherein the frame structure is adjustable.

22. The apparatus of claim 1 further comprising a frame structure securing the magnet assemblages in a configuration wherein a magnetic storage medium may pass through the frame structure and the gap such that the magnetic storage medium is at least partially erased.

23. The apparatus of claim 22 wherein the frame structure is adjustable.

24. A method for erasing magnetic storage media comprising:

providing at least one pair of magnet assemblages wherein each magnet assemblage comprises at least three segments and each segment has a direction of magnetization approximately perpendicular to the longest dimension of the segment and wherein at least one magnet assemblage is arranged such that the segments are aligned adjacently with the direction of magnetization of each successive segment rotated by approximately 90 degrees relative to the previous segment; and passing a magnetic storage medium through a gap defined by each pair of magnet assemblages such that the magnetic storage medium is at least partially erased by interaction with a magnetic field created by each assemblage, wherein each successive segment alternates between a first width in a direction along a path traveled by the magnetic storage medium and a second width in the direction alone the path traveled by the magnetic storage medium.

25. The apparatus of claim 1 wherein the first width is approximately one half the second width.

26. The apparatus of claim 17 wherein the first width is approximately one half the second width.

27. The method of claim 24 wherein the first width is approximately one half the second width.

* * * * *